United States Patent [19]
Hotta

[11] Patent Number: 5,934,398
[45] Date of Patent: Aug. 10, 1999

[54] ELECTRIC VEHICLE MOTOR CONTROL APPARATUS

[75] Inventor: Yutaka Hotta, Chiryu, Japan

[73] Assignee: Aisin Aw Co., Ltd., Anjo, Japan

[21] Appl. No.: 08/695,551

[22] Filed: Aug. 12, 1996

[30] Foreign Application Priority Data

Aug. 15, 1995 [JP] Japan .................................... 7-208138

[51] Int. Cl.⁶ .................................................. B60K 1/00
[52] U.S. Cl. ........................ 180/65.8; 180/65.4; 318/434
[58] Field of Search ................................ 180/65.8, 65.2, 180/65.3, 65.4; 701/41, 42, 43; 318/432, 433, 434

[56] References Cited

U.S. PATENT DOCUMENTS

| | | | |
|---|---|---|---|
| 3,297,926 | 1/1967 | Campbell et al. | 318/138 |
| 4,934,473 | 6/1990 | Fushimi et al. | 180/79.1 |
| 5,166,584 | 11/1992 | Fukino et al. | 318/139 |
| 5,172,784 | 12/1992 | Varela, Jr. | 180/65.4 |
| 5,225,992 | 7/1993 | Kobari et al. | 364/483 |
| 5,289,890 | 3/1994 | Toyoda et al. | 180/65.8 |
| 5,600,575 | 2/1997 | Anticole | 364/557 |
| 5,676,217 | 10/1997 | Torii et al. | 180/179 |

*Primary Examiner*—Robert J. Oberleitner
*Assistant Examiner*—Pamela J. Lipka
*Attorney, Agent, or Firm*—Oliff & Berridge, PLC

[57] ABSTRACT

A current instruct value generating section including a motor speed range determining unit for detecting a locked state of a motor; a time calculating unit for, if the locked state of the motor is detected, calculating a time required for the transistor junction temperature to reach a preset upper limit; a timer unit for setting the timer to the calculated time and counting the set time; and a current limiting unit for limiting the current instruct value when the timer times out. When the locked state of the motor is detected, the time calculating unit calculates a time required for the transistor junction temperature to reach the upper limit. When the timer counts up that time, the current limiting unit limits the current instruct value, thereby preventing concentration of excessively large loads on the transistors even when the motor is locked while the motor is being supplied with phase current.

2 Claims, 9 Drawing Sheets

| MOTOR TEMPERATURE °C | 100 ≤ TEMPERATURE <150 | 150 ≤ TEMPERATURE <200 | 200 ≤ TEMPERATURE |
|---|---|---|---|
| CURRENT INSTRUCT VALUE | 150A | 100A | 50A |

FIG.10

ELECTRIC VEHICLE MOTOR CONTROL APPARATUS

BACKGROUND OF THE INVENTION

1. Field of the Invention

The invention relates to an electric vehicle motor control apparatus.

2. Description of the Related Art

In a conventional electric vehicle, a motor is driven by current supplied from a battery installed in the vehicle. Since the field current is supplied to the motor through the brush and the commutator that slide on each other, the conventional electric vehicle requires checks and maintenance of the brush and the commutator which are inconvenient and, in addition, the sliding therebetween produces unpleasant noises.

To eliminate these problems, an electric vehicle has been provided which uses a brushless DC motor comprising a permanent magnet rotor and stator coils. For the brushless DC motor, sine-wave signals of three phases, that is, U-phase, V-phase and W-phase, are generated corresponding to the magnetic pole position of the rotor. The sine-wave signals are sent together with a current instruct value to a current waveform control circuit. The current waveform control circuit generates a three-phase pulse-width modulated signal (PWM) having a pulse width corresponding to the current instruct value, which is sent to a base drive circuit. The base drive circuit generates a transistor drive signal corresponding to the pulse-width modulated signal, and outputs the signal to a bridge circuit (inverter). The bridge circuit, comprising six transistors, turns on the transistors to generate a phase current only while the pulse-width modulated signal remains on, and supplies the phase current to the stator coils. The phase current is then detected by a current sensor and fed back to the current waveform control circuit.

If the conventional electric vehicle stops on a steep uphill while the motor is being supplied with phase current, the motor is locked stopping the rotor. Since the sine-wave signal is held in a state corresponding to the rotor magnetic pole position in such a case, the pulse-width modulated signal is also held in a comparable state. Consequently, the on-off duty ratio of a specific one or more of the transistors becomes approximately 100% and the phase current continues flowing through those transistors, causing an excessively large load concentration on the transistors. If the motor continues operating at a low speed, as opposed to coming to stop, all the transistors continue to be on for a long time, during which the phase current continues flowing, thus causing a concentration of excessively large loads on the transistors.

SUMMARY OF THE INVENTION

The invention is intended to solve the above-stated problems of the conventional electric vehicles. It is an object of the invention to prevent the concentration of excessively large loads on the transistors when the motor is locked or continues operating at low speeds while the motor is being supplied with phase current.

According to a first aspect of the invention, there is provided an electric vehicle motor control apparatus comprising an electric motor provided in an electric vehicle; vehicle traveling condition detecting means for detecting the traveling condition of the vehicle; current instruct value generating means for generating a current instruct value based on a signal from the vehicle traveling condition detecting means; a current waveform control circuit for generating a pulse-width modulated signal corresponding to the current instruct value from the current instruct value generating means; a bridge circuit for generating a phase current by selectively turning on and off a plurality of transistors and for supplying the phase current to the motor; and a base drive circuit for generating a switching signal to turn on and off each transistor of the bridge circuit, corresponding to the pulse-width modulated signal from the current waveform control circuit. The current instruct value generating means comprises a motor locked state detecting means for detecting a locked state of the motor; time calculating means for, if the motor locked state detecting means detects the locked state of the motor, calculating a time required for a junction temperature of each transistor to reach a preset upper limit; a timer means for setting a timer to the time calculated by the time calculating means and for counting the time; and current limiting means for limiting the current instruct value when the timer finishes counting the time.

It is preferred that the time calculating means comprise current detecting means for detecting the phase current supplied to the motor, and temperature detecting means for detecting a temperature of a heat sink fixed to the transistors, so that the time calculating means can calculate a time required for the junction temperature of each transistor to reach the upper limit on the basis of the phase current detected by the current detecting means and the temperature detected by the temperature detecting means.

According to a second aspect of the invention, there is provided an electric vehicle motor control apparatus comprising an electric motor provided in an electric vehicle; vehicle traveling condition detecting means for detecting the traveling condition of the vehicle; current instruct value generating means for generating a current instruct value based on a signal from the vehicle traveling condition detecting means; a current waveform control circuit for generating a pulse-width modulated signal corresponding to the current instruct value from the current instruct value generating means; a bridge circuit for generating a phase current by selectively turning on and off a plurality of transistors and for supplying the phase current to the motor; and a base drive circuit for generating a switching signal to turn on and off each transistor of the bridge circuit, corresponding to the pulse-width modulated signal from the current waveform control circuit. The current instruct value generating means comprises motor speed range determining means for determining whether the operating speed of the motor is at most a predetermined speed; junction temperature calculating means for calculating a junction temperature of each transistor if the motor operating speed determining means determines that the operating speed of the motor is equal to or less than the predetermined speed; and current limiting means for comparing the junction temperature calculated by the junction temperature calculating means with a preset upper limit and for, if the calculated junction temperature exceeds the preset upper limit, limiting the current instruct value.

It is preferred that the junction temperature calculating means comprise current detecting means for detecting the phase current supplied to the motor, and temperature detecting means for detecting a temperature of a heat sink fixed to the transistors, so that the junction temperature calculating means can calculate a junction temperature of each transistor based on the phase current detected by the current detecting means and the temperature detected by the temperature detecting means.

In the structure according to the first aspect of the invention, when the vehicle traveling condition detecting means detects a vehicle traveling condition, the current instruct value generating means generates a current instruct value corresponding to the vehicle traveling condition. After the current waveform control means generates a pulse-width modulated signal corresponding to the current instruct value, the base drive circuit generates a switching signal corresponding to the pulse-width modulated signal and outputs the switching signal to the bridge circuit. Upon receiving the switching signal, the bridge circuit selectively turns on and off the transistors to generate a phase current.

If the motor locked state detecting means detects the locked state of the motor, the time calculating means calculates a time required for the junction temperature of each transistor to reach the preset upper limit. The timer means then counts the set time. When the timer counts up the set time, the current limiting means limits the current instruct value.

The first aspect of the invention thereby achieves various advantages as follows. Because the current instruct value is limited when the junction temperature reaches the upper limit, it is possible to prevent concentration of excessively large loads on the transistors. Furthermore, since there is no need to directly detect the junction temperature, the control performance of the electric vehicle motor control apparatus is accordingly improved and the production costs are reduced.

With the aforementioned preferred structure according to the first aspect of the invention, it is possible to limit the phase current in a relatively short time because if the heat sink temperature becomes higher, the temperature detecting means detects the higher temperature.

In the structure according to the second aspect of the invention, when the vehicle traveling condition detecting means detects a vehicle traveling condition, the current instruct value generating means generates a current instruct value corresponding to the vehicle traveling condition. After the current waveform control means generates a pulse-width modulated signal corresponding to the current instruct value, the base drive circuit generates a switching signal corresponding to the pulse-width modulated signal and outputs the switching signal to the bridge circuit. Upon receiving the switching signal, the bridge circuit selectively turns on and off the transistors to generate a phase current, as in the structure according to the first aspect of the invention.

When the motor speed range determining means determines that the motor operating speed is equal to or less than the predetermined speed, the junction temperature calculating means calculates a junction temperature of each transistor, which is set as the junction temperature and compared with the preset upper limit temperature. When the calculated junction temperature exceeds the upper limit, the current limiting means limits the current instruct value.

Consequently, the second aspect of the invention achieves advantages similar to those of the first aspect of the invention. That is, since the current instruct value is limited when the junction temperature reaches the upper limit, it is possible to prevent the concentration of excessively large loads on the transistors. Furthermore, since there is no need to directly detect the junction temperature, the control performance of the electric vehicle motor control apparatus can be accordingly improved, and the production costs can be reduced.

With the aforementioned preferred structure according to the second aspect of the invention, it is possible to limit the phase current in a relatively short time because if the heat sink temperature becomes higher, the temperature detecting means detects a higher temperature, as in the preferred structure according to the first aspect of the invention.

BRIEF DESCRIPTION OF THE DRAWINGS

The foregoing and further objects, features and advantages of the invention will become apparent from the following description of preferred embodiments with reference to the accompanying drawings, wherein.

DETAILED DESCRIPTION OF PREFERRED EMBODIMENTS

Preferred embodiments of the invention will be described hereinafter with reference to the accompanying drawings.

Figure 2:
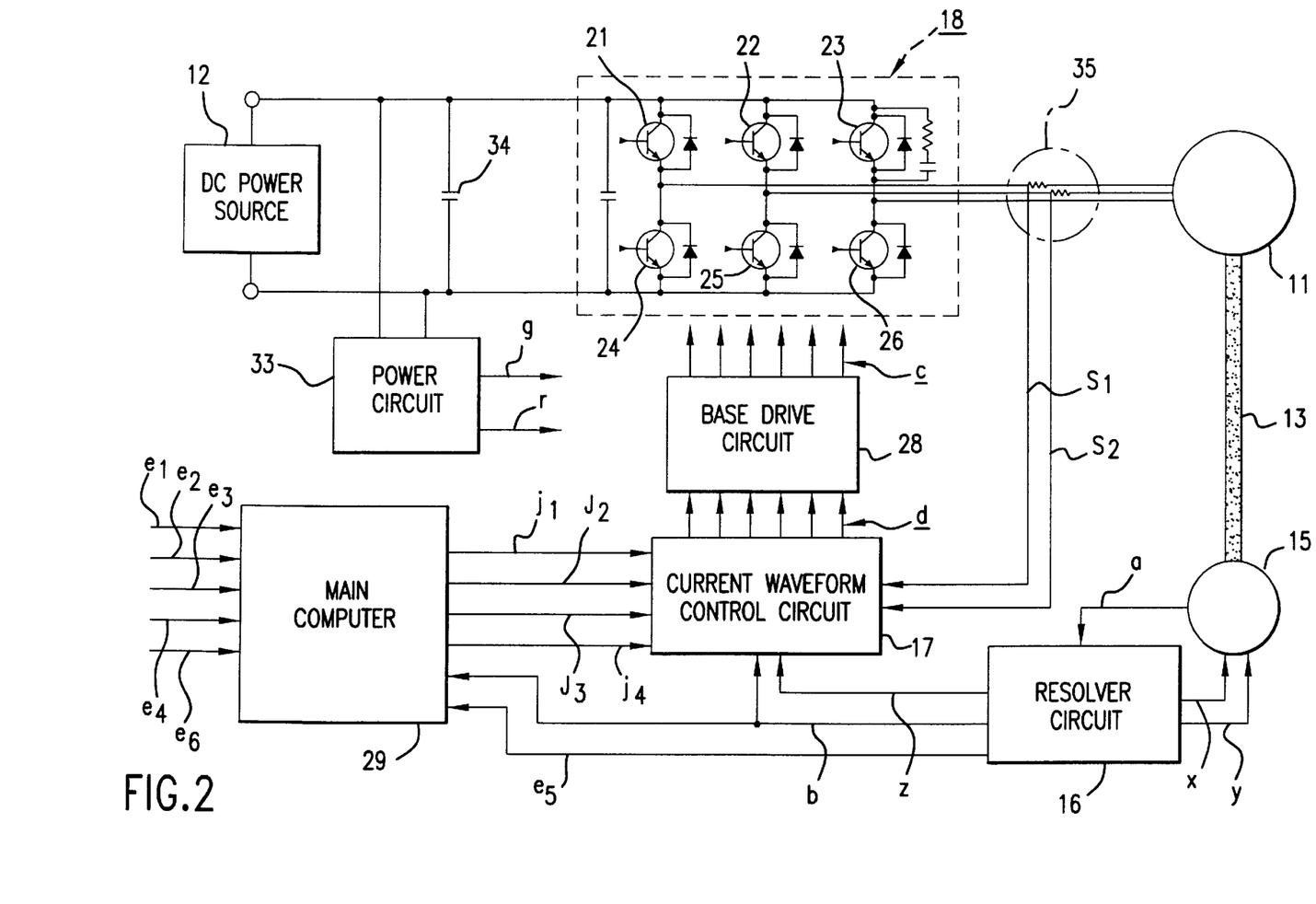
FIG. 2 illustrates a drive section of an electric vehicle according to the first embodiment as shown in FIG. 1.

Referring to FIG. 2, illustrating a drive section of an electric vehicle according to a first embodiment, an electric motor 11, provided to drive the drive wheels of an electric vehicle, is driven by a current supplied from a DC power source. The motor 11 comprises a rotor (not shown) formed of a six-pole permanent magnet assembly, and stator coils (not shown), that is, electromagnetic coils of three different phases formed of windings.

A rotor shaft 13 of the motor 11 is coaxially connected to a rotational element of a resolver 15, so that the magnetic pole position of the rotor of the motor 11 can be detected. The resolver 15 is connected to a resolver circuit 16. The resolver circuit 16 applies to the resolver 15 AC voltages x (=$E_m \sin \omega t$), y (=$E_m \cos \omega t$), and receives an AC voltage resolver signal a (=$Em_s in\ (\omega t+\theta)$) from the resolver 15 to detect the magnetic pole position of the rotor, and outputs a magnetic pole position signal b to a current waveform control circuit 17. The resolver circuit 16 also generates a three-phase rotational direction signal z, corresponding to the magnetic pole position of the rotor, and outputs the rotational direction signal z to the current waveform control circuit 17.

The current waveform control circuit 17 supplies the motor 11 with a current corresponding to load conditions of the electric vehicle, for example, an amount of depression of an accelerator pedal (not shown). To supply such a current to the motor 11, the current waveform control circuit 17 generates three-phase pulse-width modulated signals d having a duty ratio corresponding to a current instruct value, and outputs the pulse-width modulated signals d to a base drive circuit 28. Upon receiving the pulse-width modulated signals d from the current waveform control circuit 17, the base drive circuit 28 generates switching signals, that is, transistor drive signals c, to drive six transistors 21–26 of a bridge circuit 18, and outputs the signals to the bridge circuit 18.

The stator coils of the motor 11 are magnetized by the bridge circuit 18. The transistors 21–26, constituting the bridge circuit 18, receive by their bases the transistor drive signals c.

A main computer 29 receives, by its input ports, various signals, that is, a mode select signal $e_1$ output from a mode select switch (not shown); an accelerator signal $e_2$, output from the accelerator sensor (not shown), corresponding to depression of the accelerator pedal; a brake signal $e_3$, output from a brake sensor (not shown), corresponding to depression of a brake pedal; a shift position signal $e_4$, output from a shift sensor (not shown), when the shift lever is shifted in range position; a motor speed signal $e_5$, output from the resolver circuit 16, indicating motor operating speed; the magnetic pole position signal b; and other signals $e_6$.

The main computer 29 outputs, from its output ports, a current instruct signal $j_1$, a rotational direction instruct signal $j_2$, a regeneration signal $j_3$, and an operation instruct signal $j_4$, to the current waveform control circuit 17.

A DC power source 12 is connected to a power circuit 33 which applies a drive voltage g to the bridge circuit 18 and a control supply voltage r to the current waveform control circuit 17, the main computer 29 and the resolver circuit 16. A smoothing capacitor 34 is connected on the input side of the bridge circuit 18. A current sensor 35 is provided as a current detecting means for detecting the phase current supplied to the motor 11. The current sensor 35 outputs a U-phase current detection signal $S_1$ and a V-phase current detection signal $S_2$ to the current waveform control circuit 17.

If the electric vehicle stops on a steep uphill while the motor 11, for driving the drive wheels, is being supplied with the phase current, the motor 11 is locked and the rotor is stopped. In such a case the sine-wave signal is maintained in a state corresponding to the magnetic pole position of the rotor, so that the pulse-width modulated signal d is also maintained in a comparable state. Consequently, the on-off duty of specific one or more of the transistors 21–26, of the bridge circuit for the drive wheels, remains about 100%, so that the phase current continues flowing through those transistors.

If the motor 11 remains locked for a long time, the phase current continues flowing through those specific transistors, causing an excessively large load concentration thereon.

To avoid this undesired event, the phase current supply to the motor 11 is limited on the basis of the detection of a heat sink temperature.

Figure 3:
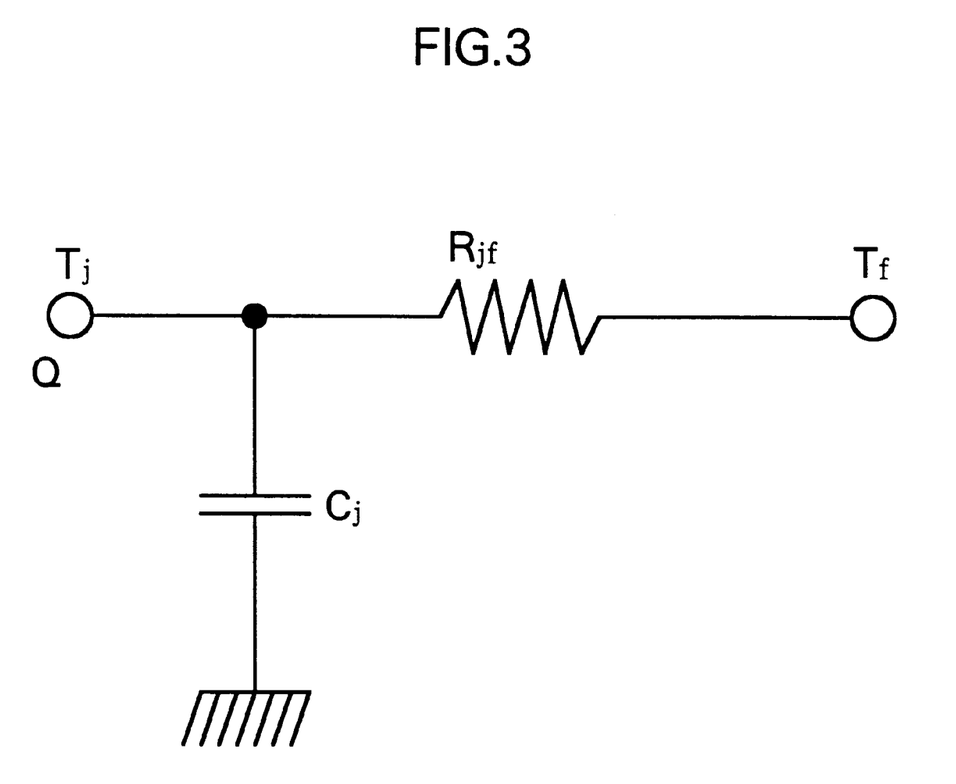
FIG. 3 is a temperature equivalent circuit of a transistor according to the first embodiment.

FIG. 3 illustrates a transistor temperature-equivalent circuit according to the first embodiment. The temperature-equivalent circuit, as shown in FIG. 3, comprises the transistors 21–26 (FIG. 2) and the heat sink, that is, a fin formed on the casing. Thus, there is a temperature-equivalent circuit for each drive wheel. When a transistor 21–26 is turned on, allowing conduction of phase current therethrough, heat is generated to increase the junction temperature of the chip (hereinafter, simply referred to as "junction temperature") $T_j$ while the heat flows to the fin.

The junction temperature $T_j$ is estimated, through the following equation, based on a junction loss Q calculated from a phase current that is about to flow through the junction, and the temperature of the fin (hereinafter, referred to as "fin temperature") $T_f$ detected immediately before the phase current begins to flow.

$$T_j = Q/R_{jf} + T_f - \{Q/R_{jf} - (T_{jo} - T_f)\} \cdot \{\exp(-R_{jf}/C_j t)\} \quad (1)$$

where $T_{jo}$ is an initial temperature of the junction (hereinafter, referred to as "initial junction temperature"), $c_j$ is the heat capacity of the junction (hereinafter, referred to as "junction heat capacity"), $R_{jf}$ is a thermal resistance between the junction and the fin, and t is time. The junction loss Q includes a normal loss caused by the phase current that flows through the junction, and a switching loss caused by changes in phase current induced by the switching operation. A rise in the fin temperature $T_f$ is delayed to a greater extent when the thermal resistance $R_{jf}$ between the junction and the fin is larger or when the junction heat capacity $C_j$ is higher.

The above equation provides a time required for the junction temperature $T_j$ to reach an upper limit after the motor 11 has been locked (hereinafter, referred to as "temperature rise time"). Based on the temperature rise time, the amount of phase current that flows through each of the transistors 21–26 (hereinafter, referred to as "transistor current") can be limited.

Since the transistor current can thus be limited corresponding to the junction temperature $T_j$ if the motor 11 is locked, the junction temperature $T_j$ can be prevented from reaching the upper limit. If the fin temperature $T_f$ is already high, the temperature rise time becomes short so that the transistor current is limited to a short time. Thus, the excessively large load concentration on the transistors 21–26 can be prevented.

In addition, since the first embodiment does not need to directly detect the junction temperature $T_j$ but simply needs to detect the fin temperature $T_f$, the embodiment provides for good control performance and cost reduction.

Figure 1:
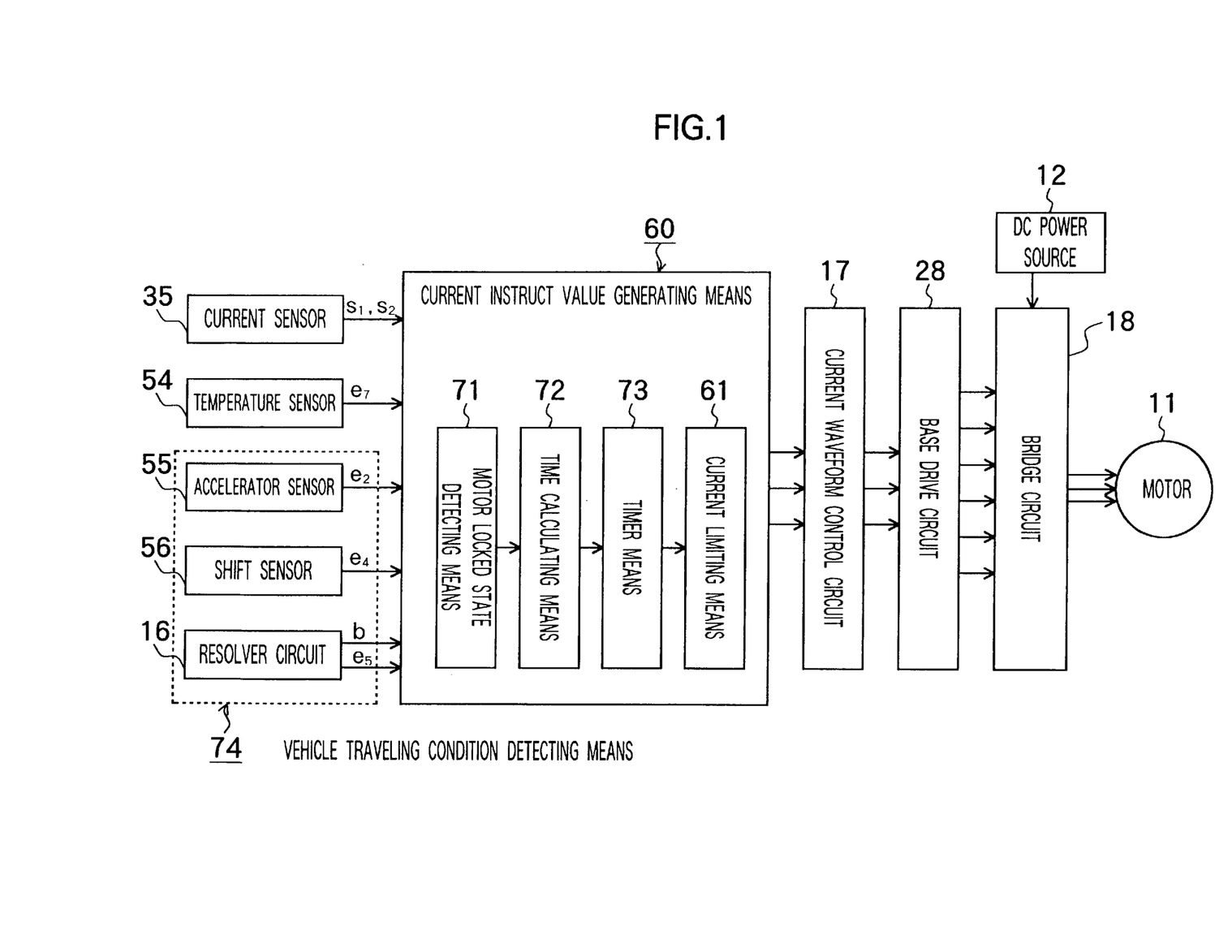
FIG. 1 is a block diagram of a first embodiment of the electric vehicle motor control apparatus of the invention.

A method for limiting the transistor current will be described with reference to the block diagram of FIG. 1 illustrating the first embodiment of the electric vehicle motor control apparatus of the invention.

The block diagram shows the motor 11, the DC power source 12, the resolver circuit 16 for generating the motor speed signal $e_5$, and the motor magnetic pole signal b, the bridge circuit 18, and the base drive circuit 28. Further, a current sensor 35 is provided for detecting the phase current and generating the U-phase current detection signal $s_1$ and the V-phase current detection signal $s_2$. A temperature sensor 54 is provided, as the temperature detecting means, for detecting the fin temperature $T_f$ (see FIG. 3) and generating a temperature signal $e_7$. An accelerator sensor 55 detects depression of an accelerator pedal (not shown) for throttle opening, and generates the accelerator signal $e_2$. A shift sensor 56 detects the shift range position, that is, the shift position in a range selected by an operator using the shift lever (not shown), and generates the shift position signal $e_4$. The resolver circuit 16, the accelerator sensor 55 and the shift sensor 56 constitute vehicle traveling condition detecting means 74.

A current instruct value generating means 60, formed of at least a CPU, a RAM, and a ROM, calculates a current instruct value based on the motor operating speed detected by the resolver circuit 16 and throttle opening detected by the accelerator sensor 55.

The current instruct value generating means 60 comprises motor locked state detecting means 71 for detecting a locked state of the motor 11; time calculating means 72 for, when the motor locked state detecting means 71 detects the locked state of motor 11, calculating a time required for the junction temperature of a transistor to reach a preset upper limit, that is, the temperature rise time; a timer means 73 for setting a timer (not shown) to the temperature rise time calculated by the time calculating means 72 and for counting the temperature rise time, and a current limiting means 61 for limiting the current instruct value when the timer means counts up the time. The time calculating means 72 calculates a temperature rise time based on the value of phase current detected by the current sensor 35 and a fin temperature detected by the temperature sensor 54. The current instruct value generating means 60 outputs the calculated current instruct value to the current waveform control circuit 17.

The operation of the first embodiment will be described with reference to the flowchart shown in FIG. 4.

At step S1 the motor speed signal $e_5$ from the resolver circuit 16 (FIG. 1), the accelerator signal $e_2$ from the accelerator sensor 55, and the shift position signal $e_4$ from the shift sensor 56 are read. The motor speed signal $e_5$, the accelerator signal $e_2$ and the shift position signal $e_4$ constitute vehicle signals.

At step S2 the magnetic pole position signal b from the resolver circuit 16, the U-phase current detection signal $S_1$ and the V-phase current detection signal $S_2$ from the current sensor 35, and the temperature signal $e_7$ from the temperature sensor 54 are read. The magnetic pole position signal b, the U-phase current detection signal $S_1$, the V-phase current detection signal $S_2$, and the temperature signal $e_7$ constitute motor signals.

Figure 9:
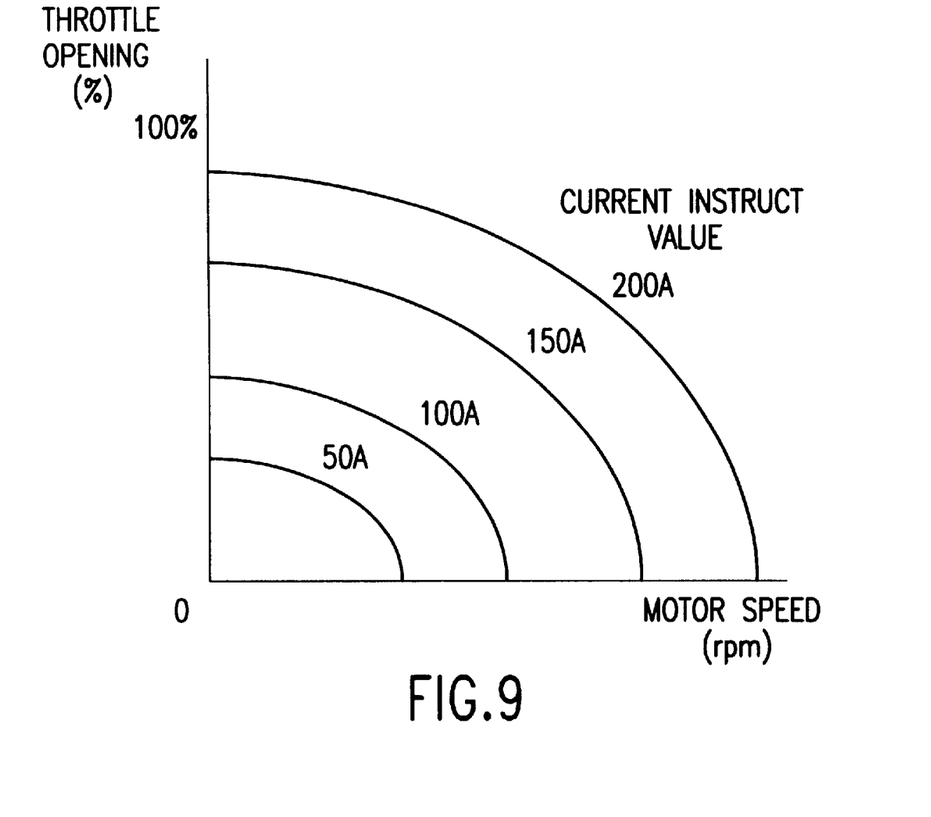
FIG. 9 is an exemplary map for determining a current instruct value when the motor temperature is below a threshold value, for example, 100° C.
Figure 10:
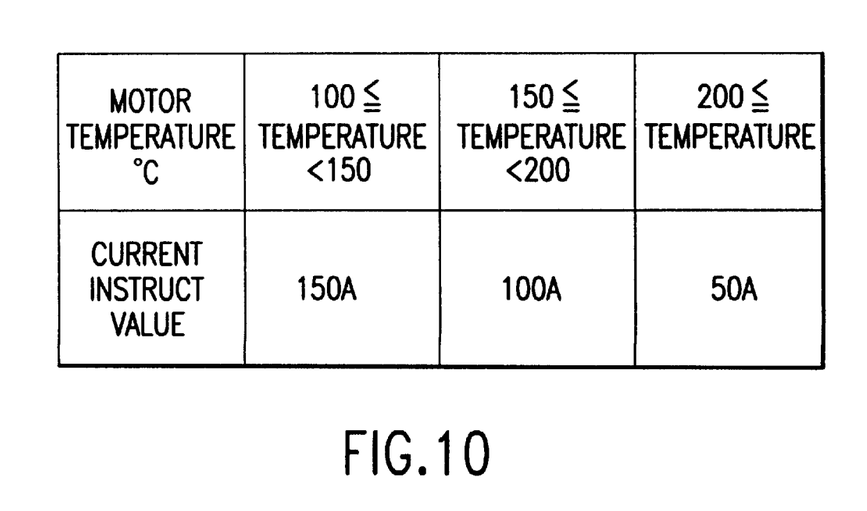
FIG. 10 is an exemplary map for determining a current instruct value when the motor temperature is above the threshold value.

At step S3 a current instruct value is determined from maps based on the read vehicle signals, motor signals and motor temperature as shown in the exemplary maps of FIGS. 9 and 10.

At step S4 it is determined whether a current limiting timer (not shown) has been set. If the timer has been set, the operation proceeds to step S5. If the timer has not been set, the operation proceeds to step S6.

At step S5 it is determined whether the timer has counted up the set time. If the timer has timed out, the operation proceeds to step S7. If the timer has not yet timed out, the operation proceeds to step S6.

At step S6, the current instruct value calculated in step S3 is output to the current waveform control circuit 17.

If at step S5 the timer has timed out, then at step S7 the current instruct value calculated in step S3 is limited to a predetermined value that protects the transistors 21–26 of the bridge circuit 18 and the limited current instruct value is output.

Figure 5:
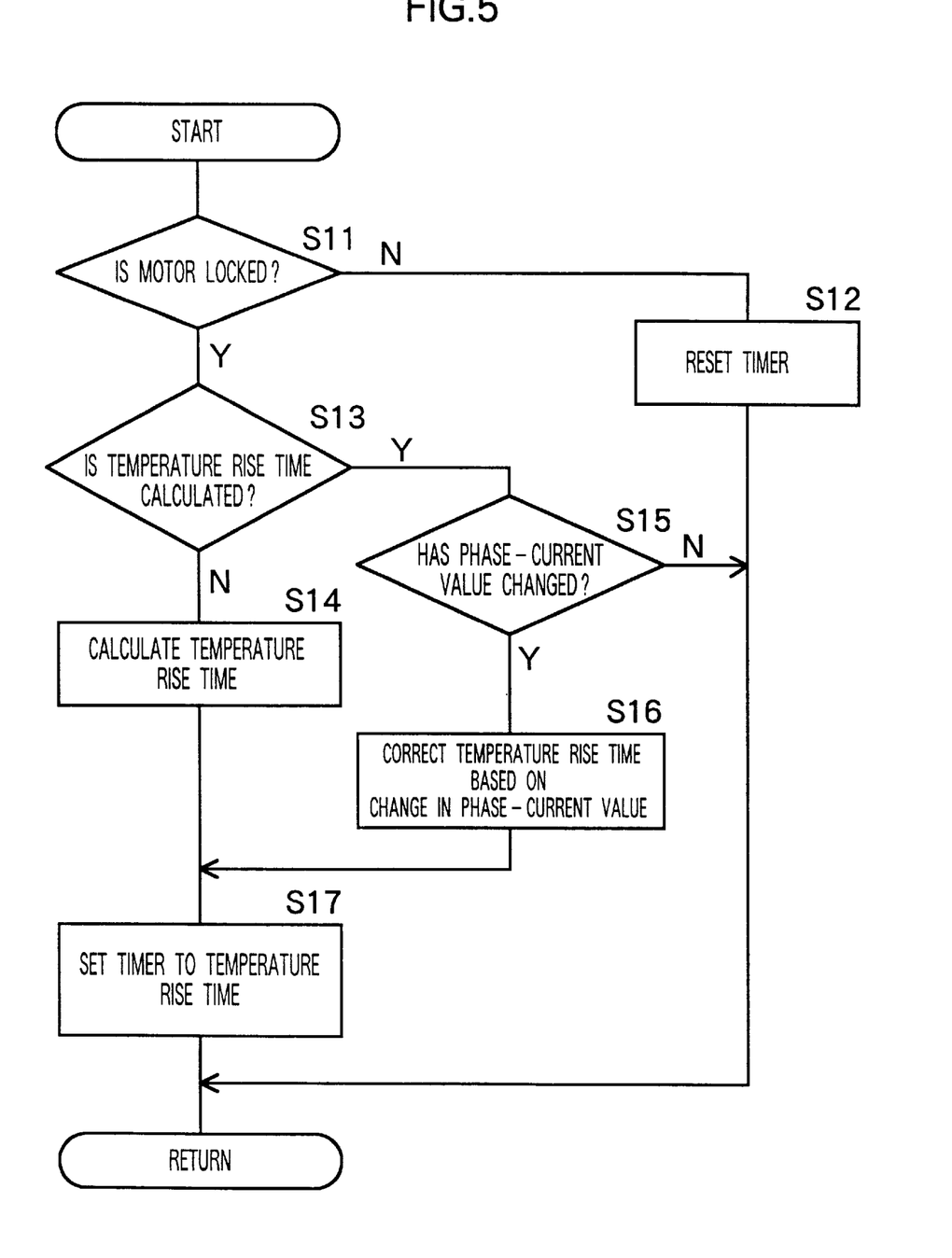
FIG. 5 is a flowchart illustrating a 100 $\mu s$ interrupt processing according to the first embodiment.

An interrupt processing for resetting the timer will be described with reference to the flowchart of FIG. 5 illustrating a 100 μs interrupt processing according to the first embodiment.

At step S11 it is determined whether, for each driven wheel, the motor is in a locked state on the basis of the magnetic pole position signal b from the resolver circuit 16 (FIG. 1). If the motor 11 is in the locked state, the operation proceeds to step S13. If the motor 11 is not in the locked state, the operation proceeds to step S12. Step S12 resets the current limiting timer.

At step S13 it is determined whether a temperature rise time has been calculated. If a temperature rise time has been calculated, the operation proceeds to step S15. If a temperature rise time has not been calculated, the operation proceeds to step S14.

At step S14 a temperature rise time is calculated using the equation (1) based on the preset upper limit for the junction temperature $T_j$ (FIG. 3) of the transistors 21–26 (FIG. 2), that prevents damage to the transistors 21–26, the value of phase current detected by the current sensor 35, and a fin temperature $T_f$ detected by the temperature sensor 54.

If the temperature rise time has been calculated at step S13, then at step S15 it is determined whether the phase current value detected by the current sensor 35 has changed from the phase current value detected during the previous sampling operation where a temperature rise time was calculated. If the phase current value has changed, the operation proceeds to step S16. If the phase current value has not changed, the operation returns to the start. The value of the phase current can also be calculated from, for example, the current instruct value calculated in step S3.

At step S16 the calculated temperature rise time is corrected on the basis of the change in phase current value and at step S17 the timer is set to the temperature rise time.

The limiting of current through a specific one or more of the transistors is sufficient if the motor 11 is completely locked. However, if the motor 11 continues running at a low speed, all the transistors will continue to be on for a long time, during which the phase current will continue flowing therethrough. A second embodiment of the electric vehicle motor control apparatus of the invention is provided to cope with such an incident.

Figure 6:
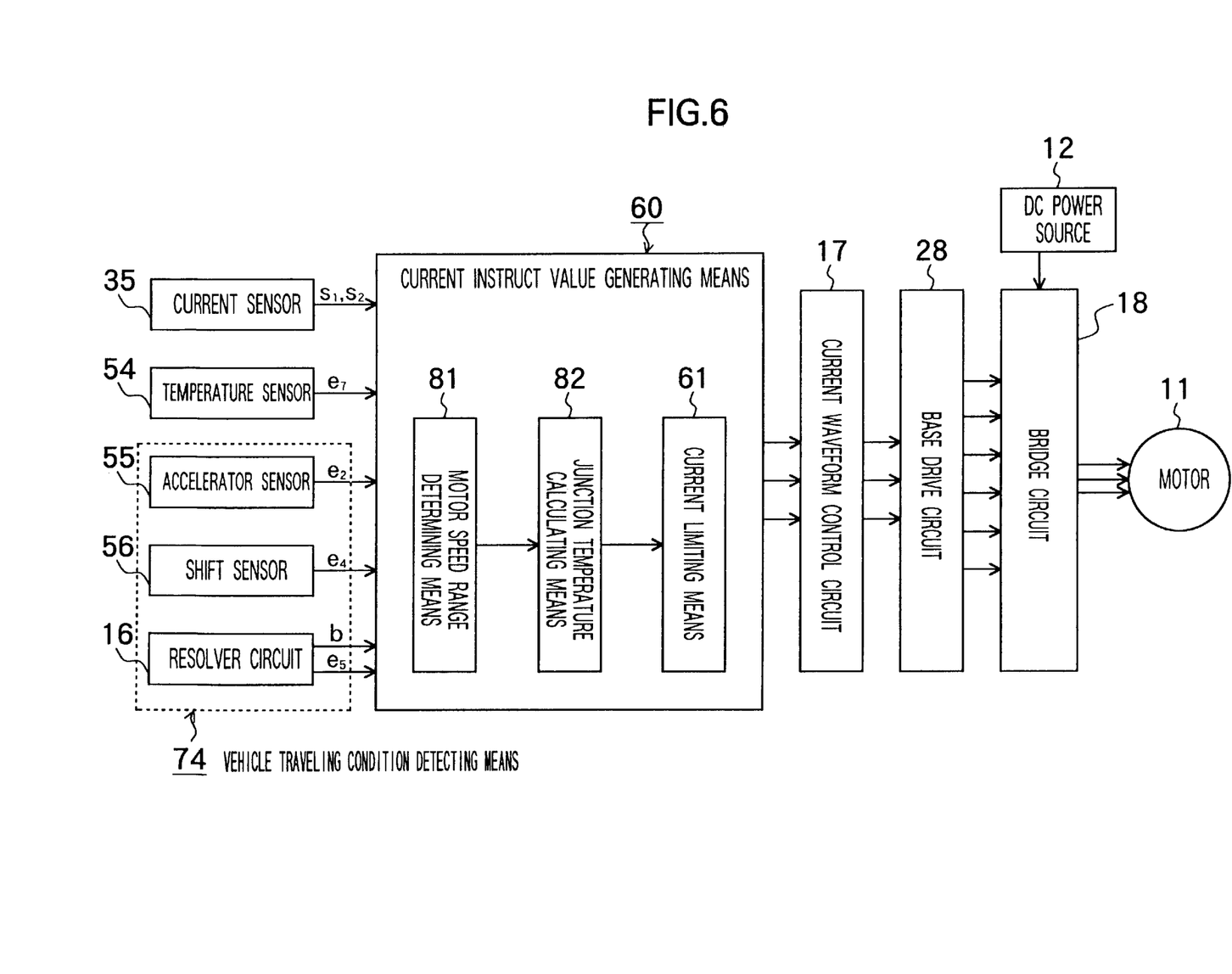
FIG. 6 is a block diagram of a second embodiment of the electric vehicle motor control apparatus of the invention.

FIG. 6 shows a block diagram of the second embodiment. Components comparable those of the first embodiment are denoted by comparable numerals in the diagram, and will not be described again.

According to the second embodiment, if the operating speed of the motor 11 becomes, for example, 10 rpm or lower, the junction loss Q (FIG. 3) of each of the transistors 21–26 (FIG. 2) is calculated to estimate a junction temperature $T_j$.

To perform this operation, current instruct value generating means 60 comprises motor speed range determining means 81 for determining whether the operating speed of the motor 11 is at most a preset speed; junction temperature calculating means 82 for calculating a junction temperature $T_j$ of each of the transistors 21–26 when the motor speed range determining means 81 determines that the operating speed of the motor 11 is equal to or less than the preset speed; and current limiting means 61 for comparing the junction temperature $T_j$, calculated by the junction temperature calculating means 82, with a preset upper limit temperature and, when the calculated junction temperature $T_j$ exceeds the upper limit, limiting the current instruct value. The junction temperature calculating means 82 calculates a junction temperature of each of the transistors 21–26 on the basis of the value of the phase current detected by the current sensor 35 and the fin temperature $T_f$ detected by a temperature sensor 54.

Thus, although all the transistors 21–26 continue to be on for a long time, during which phase current continues flowing therethrough, if the motor 11 operates at a low speed as opposed to being locked, it is possible to reliably limit the transistor current on the basis of the junction temperature $T_j$ of each transistor.

Figure 7:
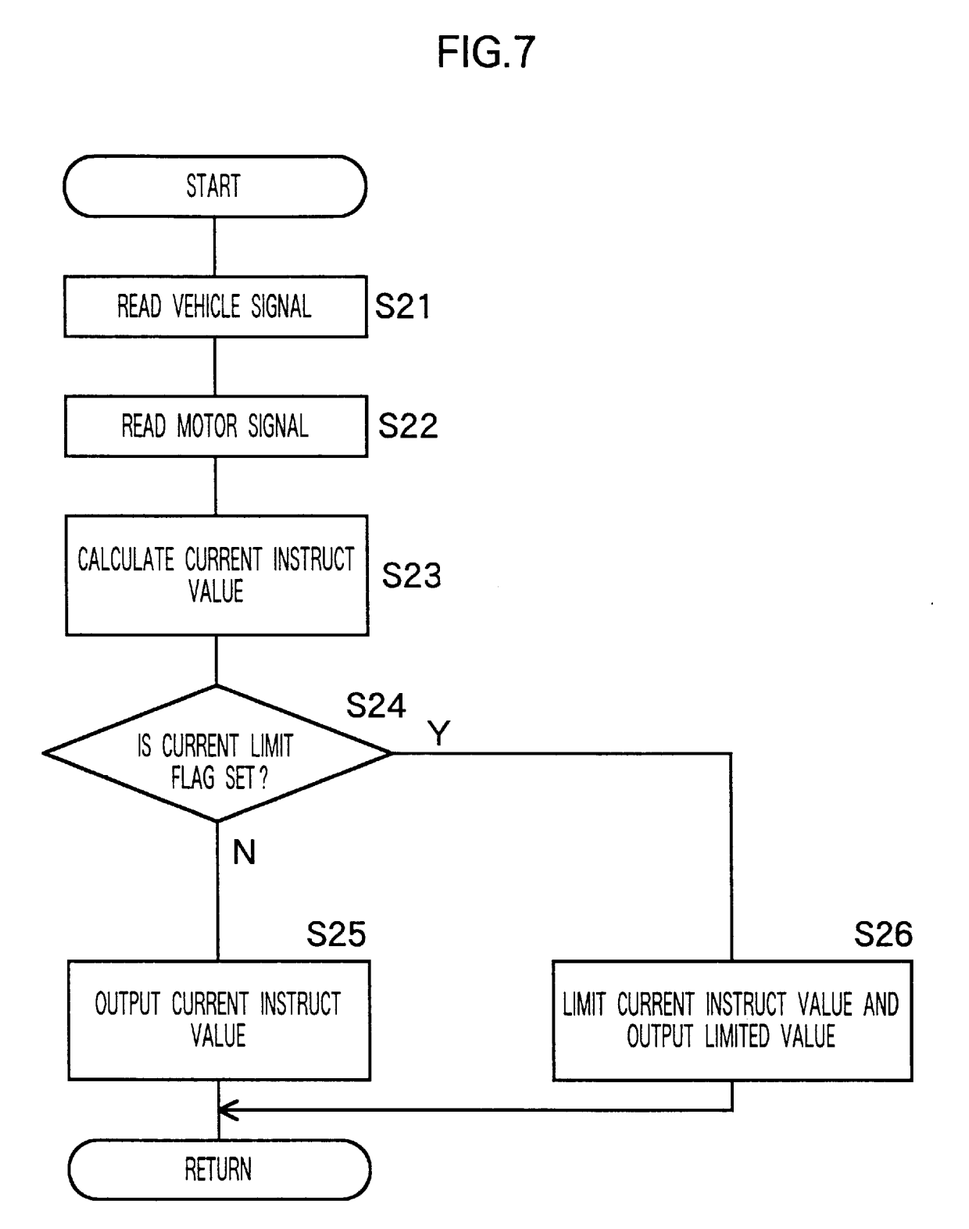
FIG. 7 is a flowchart illustrating the operation according to the second embodiment.

The operation of the second embodiment will be described with reference to the flowchart of FIG. 7.

At step S21 the motor speed signal $e_5$ from the resolver circuit 16 (FIG. 6), the accelerator signal $e_2$ from the accelerator sensor 55, and the shift position signal $e_4$ from the shift sensor 56 are read. The motor speed signal $e_5$, the accelerator signal $e_2$ and the shift position signal $e_4$ constitute vehicle signals.

At step S22 the magnetic pole position signal b from the resolver circuit 16, the U-phase current detection signal $S_1$ and the V-phase current detection signal $S_2$ from the current sensor 35, and the temperature signal $e_7$ from the temperature sensor 54 are read. The magnetic pole position signal b, the U-phase current detection signal $S_1$, the V-phase current detection signal $S_2$, and the temperature signal $e_7$ constitute motor signals.

Figure 4:
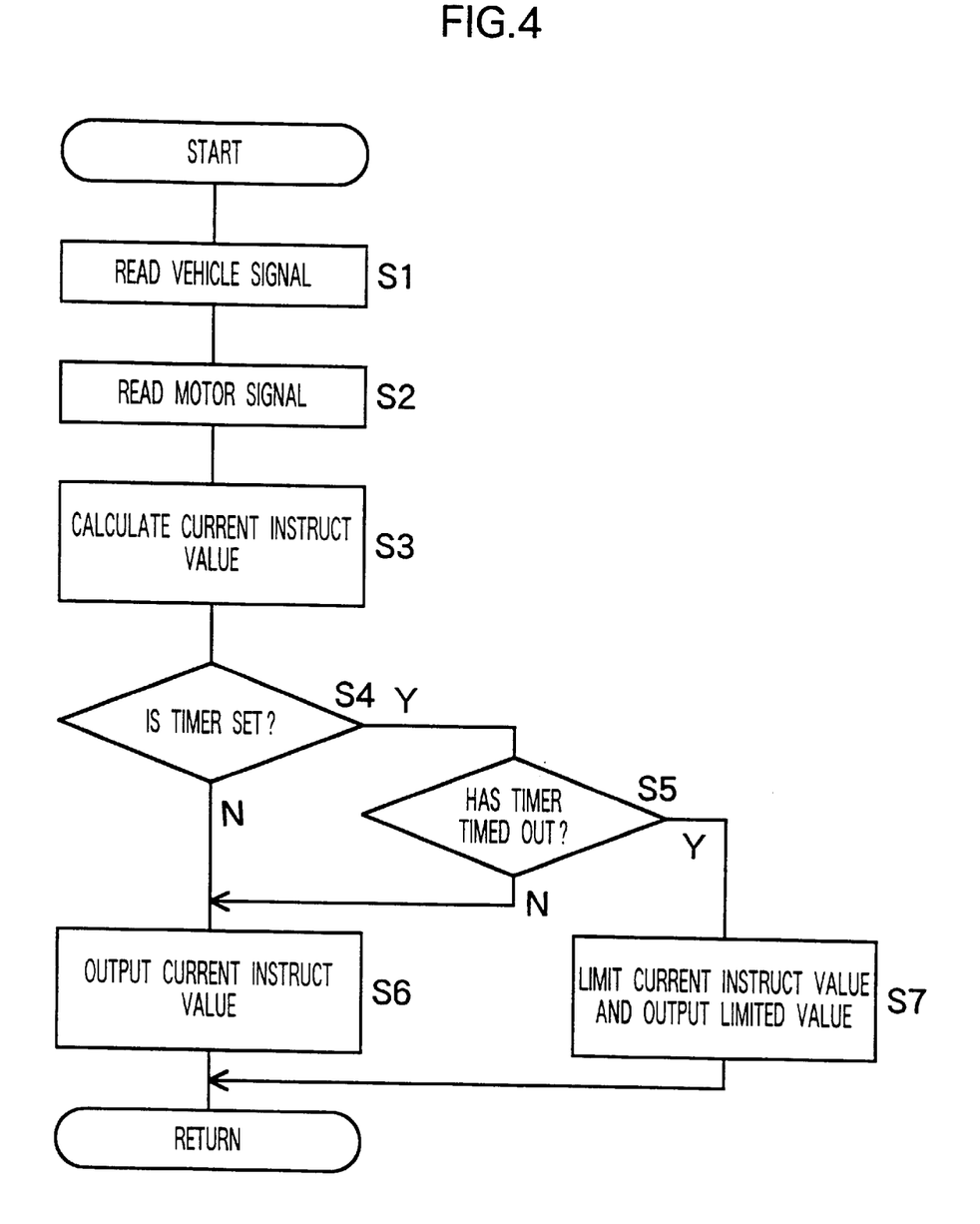
FIG. 4 is a flowchart illustrating the operation according to the first embodiment.

Then, at step S23, a current instruct value is determined from maps based on the read vehicle signals, motor signals and the motor temperature as previously described with respect to step S3 of FIG. 4.

At step S24 a determination is made whether a current limit flag has been set. If the flag has been set, the operation proceeds to step S26. If the flag is not set, the operation proceeds to step S25 where the current instruct value calculated in step S23 is output.

However, if the flag is set at step S24, then at step S26 the current instruct value calculated in step S23 is limited and the limited current instruct value is output.

Figure 8:
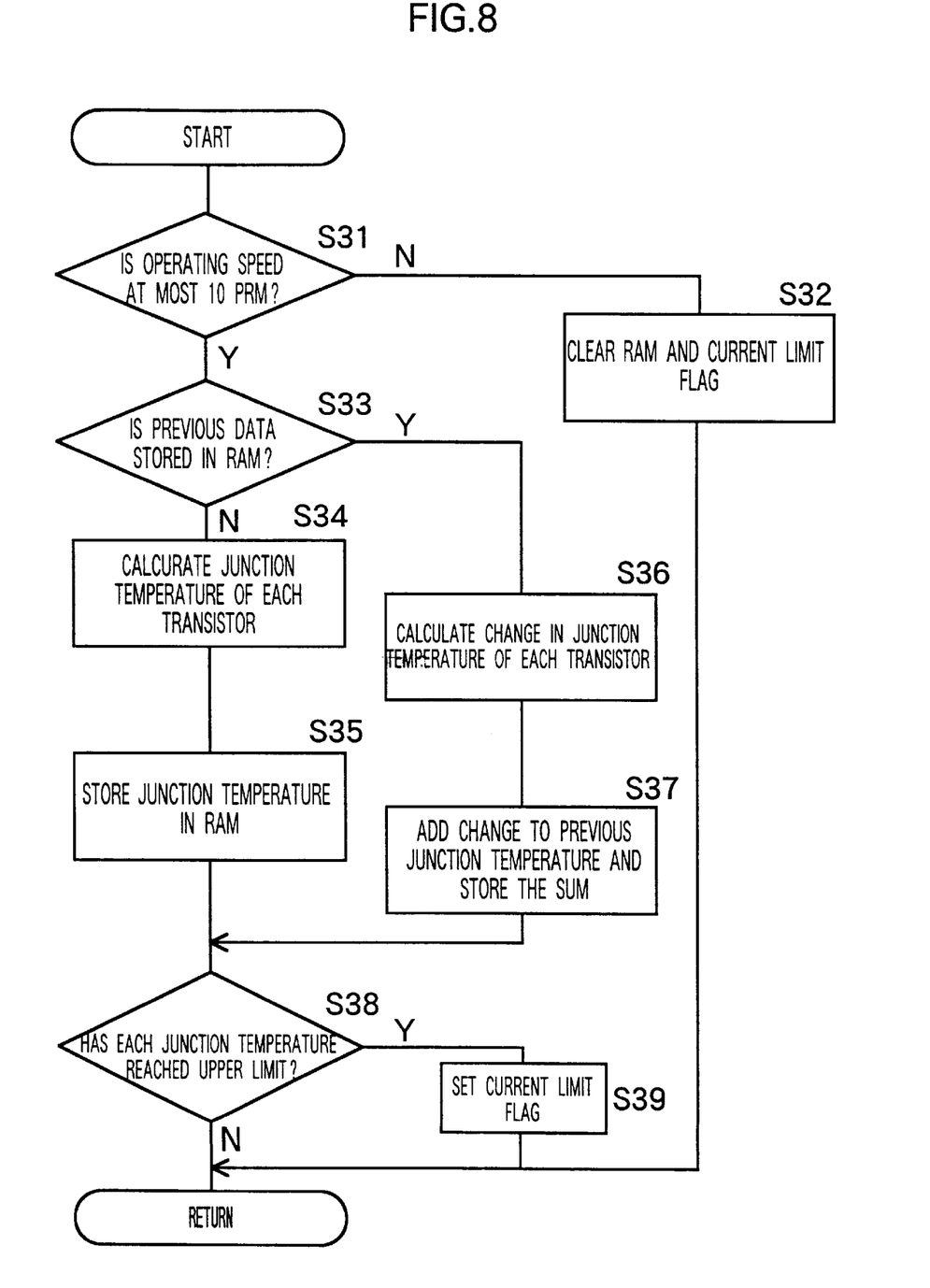
FIG. 8 is a flowchart illustrating a 100 $\mu s$ interrupt processing according to the second embodiment.

An interrupt processing for setting the current limit flag will be described with reference to the flowchart of FIG. 8, illustrating a 100 μs interrupt processing according to the second embodiment.

At step S31 it is determined whether the motor operating speed is at most 10 rpm on the basis of the motor speed signal $e_5$ from the resolver circuit 16 (FIG. 6). If the rpm is equal to or less than 10 rpm, the operation proceeds to step S33. If the motor speed is greater than 10 rpm, the operation proceeds to step S32 where the RAM and the current limit flag are cleared.

At step S33 it is determined whether the previous data is stored in the RAM. If the previous data in the RAM is stored, the operation proceeds to step S36. If the previous data is not stored in the RAM, the operation proceeds to step S34.

At step S34 a junction temperature $T_j$ for each of the transistors 21–26 (FIG. 2) is calculated using the equation (1) based on the value of phase current detected by the current sensor 35 (FIG. 6), the fin temperature $T_f$ (FIG. 3) detected by the temperature sensor 54, and a constant time $t_0$ (the interrupt processing time $t_0$=100 μs according to this embodiment). The value of phase current can also be calculated from the current instruct value calculated in step S23. At step S35 the junction temperature $T_j$ for each of the transistors 22–26 is stored into the RAM.

If, at step S33 there was previous data stored in the RAM, then at step S36 a change in the junction temperature $T_j$ of each of the transistors 22–26 is calculated. At step S37 the change to the previous junction temperature of each transistor added and the sum is stored in the RAM.

At step S38 it is determined whether the junction temperature $T_j$ of each of the transistors 22–26 has reached the upper limit. If the upper limit has been reached, the operation proceeds to step S39 where the current limit flag is set. If the upper limit has not been reached, the operation is returned to the start.

While the invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims.

What is claimed is:

1. An electric vehicle motor control apparatus for use in an electric vehicle, comprising:

an electric motor provided in the electric vehicle for driving drive wheels of the vehicle;

vehicle traveling condition detecting means for detecting traveling condition of the vehicle;

current instruct value generating means for generating a current instruct value based on a signal from the vehicle traveling condition detecting means;

a current waveform control circuit for generating a pulse-width modulated signal corresponding to the current instruct value from the current instruct value generating means;

a bridge circuit for generating a phase current by selectively turning on and off a plurality of transistors, and for supplying the phase current to the electric motor; and a base drive circuit for generating a switching signal to turn on and off each transistor of the bridge circuit, corresponding to the pulse-width modulated signal from the current waveform control circuit, the current instruct value generating means including:

a motor locked state detecting means for detecting a locked state of the electric motor;

time calculating means for, if the motor locked state detecting means detects the locked state of the electric motor, calculating a time required for junction temperature of each transistor to reach a preset upper limit;

a timer means for setting a timer to the time calculated by the time calculating means and for counting the time; and current limiting means for limiting the current instruct value when the timer finishes counting the time.

2. An electric vehicle motor control apparatus according to claim 1, wherein the time calculating means comprises:

current detecting means for detecting the phase current supply to the motor; and temperature detecting means for detecting a temperature of a heat sink fixed to the transistors, wherein the time calculating means calculates a time required for the junction temperature of each transistor to reach the upper limit on the basis of the phase current detected by the current detecting means and the temperature detected by the temperature detecting means.

* * * * *